United States Patent [19]

Kastura et al.

[11] 4,271,402

[45] Jun. 2, 1981

[54] MOTOR VEHICLE DIAGNOSTIC AND MONITORING DEVICE HAVING KEEP ALIVE MEMORY

[75] Inventors: John L. Kastura; William R. Stewart, both of Kokomo, Ind.

[73] Assignee: General Motors Corporation, Detroit, Mich.

[21] Appl. No.: 70,885

[22] Filed: Aug. 29, 1979

[51] Int. Cl.[3] ...................... G06F 11/30; G06F 15/20; G08B 21/00

[52] U.S. Cl. ................................ 340/52 F; 307/10 R; 340/518; 340/529; 364/424; 364/431; 371/29

[58] Field of Search ..................... 340/52 F, 518, 529; 307/10 R; 364/424, 431; 371/25, 29

[56] References Cited

U.S. PATENT DOCUMENTS

| | | | |
|---|---|---|---|
| 3,946,364 | 3/1976 | Codomo et al. | 340/172.5 |
| 4,031,363 | 6/1977 | Freeman et al. | 340/52 F X |
| 4,041,470 | 8/1977 | Slane et al. | 364/424 |
| 4,072,850 | 2/1978 | McGlynn | 340/52 F X |
| 4,082,370 | 4/1978 | Leiber et al. | 340/52 B X |

*Primary Examiner*—John W. Caldwell, Sr.
*Assistant Examiner*—Joseph E. Nowicki
*Attorney, Agent, or Firm*—Howard N. Conkey

[57] ABSTRACT

A diagnostic and warning system for a motor vehicle monitors the condition of a number of preselected parameters. When the condition of the parameters is representative of a fault condition, the system energizes a malfunction light in the vehicle compartment during the period of the detected fault. The particular fault detected is stored in a nonvolatile memory where it is stored independent of the subsequent condition of the respective parameter. The stored fault conditions may thereafter be read from memory to provide an indication of the malfunctions that have occurred in response to a diagnostic interrogation signal. The fault conditions stored in the nonvolatile memory are erased when a predetermined time period has lapsed since the occurrence of a detected fault condition so that old nonrecurring self-correcting faults are not retained in memory and accordingly not indicated in response to a diagnostic interrogation signal.

3 Claims, 10 Drawing Figures

MOTOR VEHICLE DIAGNOSTIC AND MONITORING DEVICE HAVING KEEP ALIVE MEMORY

This invention relates to a diagnostic and monitoring system for a motor vehicle.

Numerous diagnostic and warning systems have been proposed that monitor the condition of one or more predetermined vehicle operating parameters and control system parameters and provide a warning of a detected fault condition. These systems may provide for the energization of a single warning device when a fault condition is detected and may store a code identifying the particular detected fault. However, if the fault is of the intermittent type or self corrects, the particular fault that occurred is not ascertainable after the engine has been shut down as the fault condition stored is lost upon power shutoff. The particular fault is determined only by a readout of the stored fault condition before a power shutdown. Additionally, these systems generally provide for the storage of the first fault condition to occur with no provision for storing the occurrence of subsequent fault conditions.

It is the general object of this invention to provide an improved diagnostic and warning system for motor vehicle and motor vehicle engine control systems.

It is another object of this invention to provide for a vehicle diagnostic and warning system having a nonvolatile memory for storing the occurrence of each of the detected fault conditions and wherein the stored fault conditions are erased from memory after a predetermined time period following the occurrence of the last detected fault condition.

These and other objects of this invention are accomplished by means of a diagnostic and monitoring system having a nonvolatile memory with memory locations for storing the occurrence of each of the detected fault conditions. Upon the detection of a fault condition, a fault indicating means, such as a lamp in the vehicle driving compartment, is energized and the particular fault is stored in the nonvolatile memory which is retained independent of the subsequent state of the fault condition. The nonvolatile memory may thereafter be interrogated to determine the specific faulted conditions. So that old nonrecurring self-correcting faults are not permanently retained in the nonvolatile memory, a timer is provided which erases from the nonvolatile memory the stored fault conditions when the timed period since the last detected fault condition exceeds a predetermined time period. The timer may take the form of an engine start counter and the predetermined time period may be a predetermined number of engine starts.

The invention may be best understood by reference to the following description of a preferred embodiment and the drawings in which.

Figure 2:
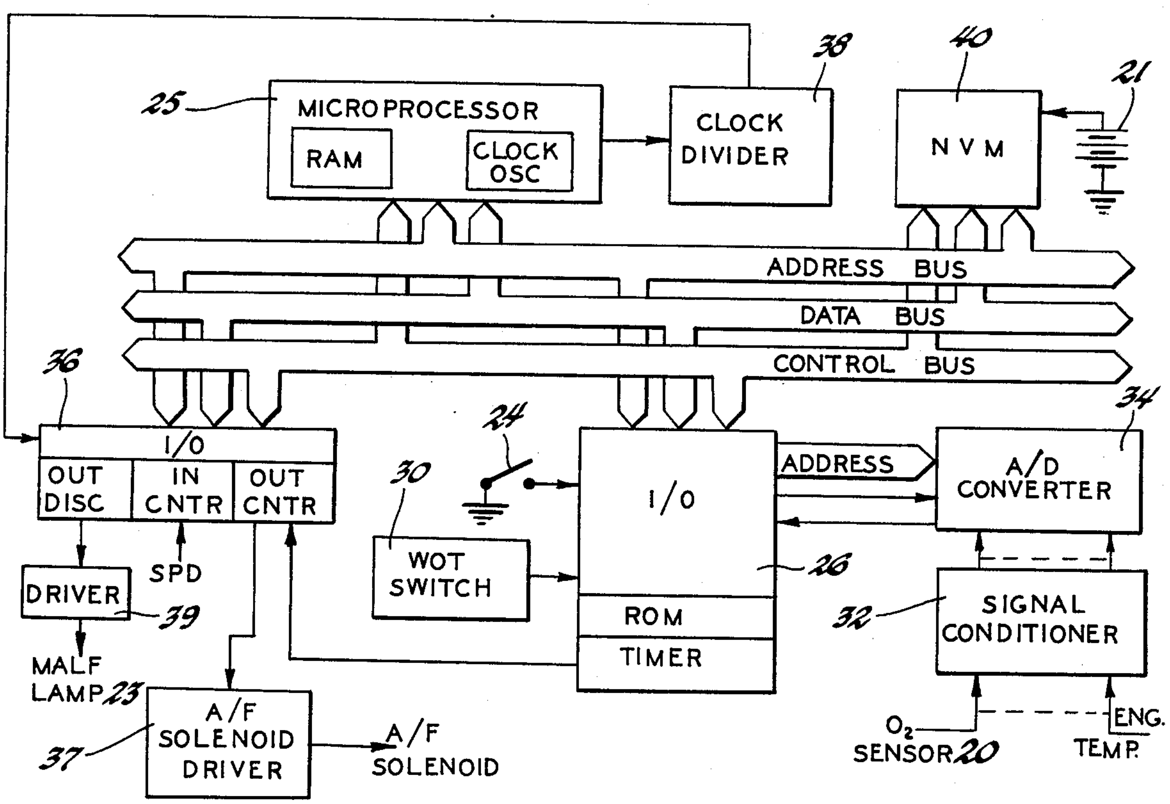
FIG. 2 illustrates a digital computer for controlling the air and fuel mixture supplied to the engine of FIG. 1 and for providing an indication of fault conditions in accord with the principles of this invention.

FIGS. 4 thru 9 are diagrams illustrative of the operation of the digital computer of FIG. 2 incorporating the diagnostic and warning principles of this invention; and FIGS. 10*a* thru 10*c* are diagrams illustrative of the memory locations in the digital computer of FIG. 2 for storing the occurrence of detected fault conditions.

Figure 1:
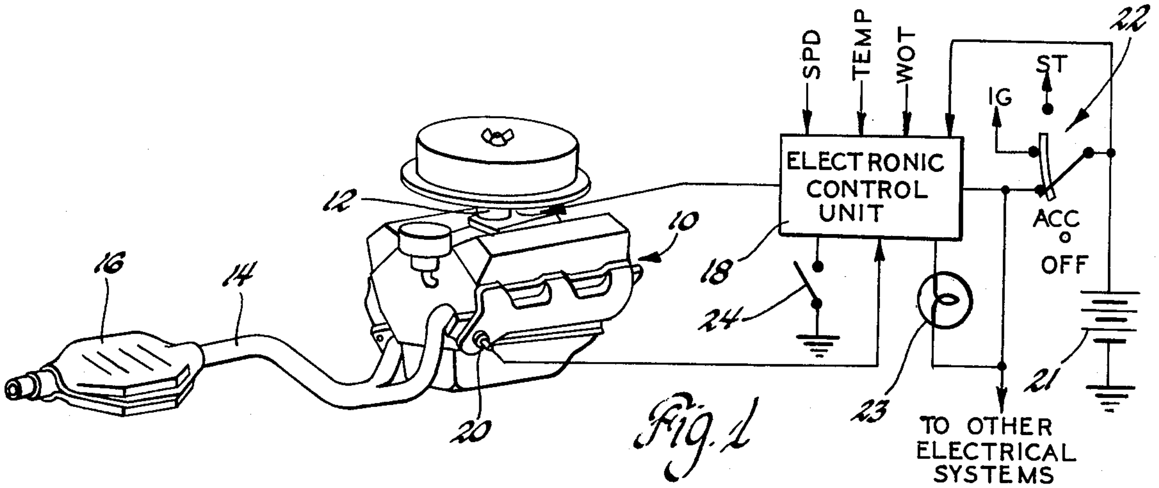
FIG. 1 illustrates an internal combustion engine incorporating a control system for controlling the air/fuel ratio of the mixture supplied to the engine and incorporating a diagnostic and warning system in accord with the principles of this invention.

Referring to FIG. 1, there is illustrated the warning and diagnostic system of this invention in conjunction with an engine air and fuel mixture controller for a vehicle internal combustion engine 10. The engine 10 is supplied with a controlled mixture of fuel and air by a carburetor 12. The combustion byproducts from the engine 10 are exhausted to the atmosphere through an exhaust conduit 14 which includes a three-way catalytic converter 16.

The air/fuel ratio of the mixture supplied by the carburetor 12 is selectively controlled either open loop or closed loop by means of an electronic control unit 18. During open loop control, the electronic control unit 18 is responsive to predetermined engine operating parameters to generate an open loop control signal to adjust the air/fuel ratio of the mixture supplied by the carburetor 12 in accord with a predetermined schedule. When the conditions exist for closed loop operation, the electronic control unit 18 is responsive to the output of a conventional air/fuel ratio sensor 20 positioned at the discharge point of one of the exhaust manifolds of the engine 10 and which senses the exhaust discharge therefrom to generate a closed loop control signal including integral and proportional terms for controlling the carburetor 12 to obtain a predetermined ratio such as the stoichiometric ratio. The carburetor 12 includes an air/fuel ratio adjustment device that is responsive to the open loop and closed loop control signal outputs of the electronic control unit 18 to adjust the air/fuel ratio of the mixture supplied by the carburetor 12.

In the present embodiment, the control signal output of the electronic control unit 18 takes the form of a pulse width modulated signal at a constant frequency thereby forming a duty cycle modulated control signal. The pulse width of the signal output of the electronic control unit 18 is controlled with an open loop schedule during open loop operation where the conditions do not exist for closed loop operation and in response to the output of the sensor 20 during closed loop operation. The duty cycle modulated signal output of the electronic control unit 18 is coupled to the carburetor 12 to effect the adjustment of the air/fuel ratio supplied by the fuel metering circuits therein. In this embodiment, a low duty cycle output of the electronic control unit 18 provides for an enrichment of the mixture supplied by the carburetor 12 while a high duty cycle value is effective to lean the mixture.

An example of a carburetor 12 with a controller responsive to a duty cycle signal for adjusting the mixture supplied by both the idle and main fuel metering circuits is illustrated in the U.S. Patent Application Ser. No. 051,978, filed June 25, 1979, which is assigned to the assignee of this invention. In this form of carburetor, the duty cycle modulated control signal is applied to a solenoid which simultaneously adjusts elements in the idle and main fuel metering circuits to provide for the air/fuel ratio adjustment.

The electronic control unit 18 also receives inputs from conventional sensors including an engine speed sensor providing a speed signal RPM, an engine coolant temperature sensor providing a temperature signal TEMP and a wide open throttle signal input WOT when the position of the vehicle throttle is at a wide open position. The voltage from the vehicle battery 21 is applied directly to the electronic control unit 18 and also thereto through the accessory contacts of a conventional vehicle ignition switch 22 which is manually operable to energize the engine starter motor circuit (not shown). The switch 22 also energizes the ignition system in the start and run positions, the latter being illustrated.

Figure 3:
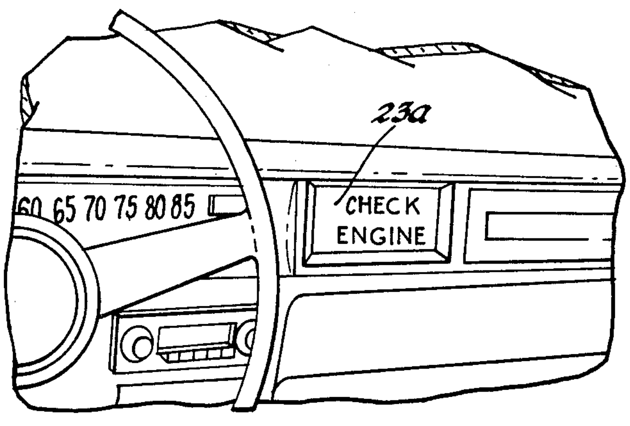
FIG. 3 is a diagram illustrating the warning provided to a vehicle operator in an engine compartment in response to a detected fault condition.

The electronic control unit 18 monitors various operating parameters of the engine 10 and provides a warning indication during the period of a detected fault condition by grounding a malfunction lamp 23 which is coupled to the vehicle battery 21 through the accessory contact of the ignition switch 22. Illustrative of the parameters monitored by the electronic control 18 for satisfactory operation are the continuity of the oxygen sensor circuit and the engine coolant temperature circuit. Additional parameters may include engine speed sensor circuit continuity, wide open throttle switch circuit continuity and carburetor solenoid circuit continuity. The malfunction lamp 23 illuminates a "check engine" display 23*a* in the vehicle driving compartment as illustrated in FIG. 3.

In accord with this invention the electronic control unit 18 stores each of the detected fault conditions in a nonvolatile memory to be described and which is maintained energized by the vehicle battery 21 even during periods of vehicle engine shutdown when the ignition switch 22 is in the off position. The electronic control unit 18 functions to provide an indication of the specific faults that have occurred in response to a diagnostic interrogation signal in the form of a ground signal provided by a diagnostic interrogation switch 24. When the diagnostic interrogation switch 24 is closed, the electronic control unit 18 flashes the malfunction lamp 23 in accord with predetermined codes to indicate the faults stored in the nonvolatile memory. The diagnostic interrogation switch 24 may take the form of a diagnostic lead grounded to the engine 10 by a mechanic to generate the diagnostic interrogation signal.

Referring to FIG. 2, the electronic control unit 18 in the present embodiment takes the form of a digital computer that provides a pulse width modulated signal at a constant frequency to the carburetor 12 to effect adjustment of the air/fuel ratio. The digital computer further provides a ground signal to the malfunction lamp 23 to provide an indication of a detected fault condition during the period of the fault condition and further provides for the flashing of the malfunction lamp 23 in response to a diagnostic interrogation signal provided by the switch 24 of FIG. 1 to indicate the malfunctions stored in the nonvolatile memory in the electronic control unit 18.

The digital system includes a microprocessor 25 that controls the operation of the carburetor 12 and provides for the diagnostic and warning functions of this invention by executing an operating program stored in an external read-only memory (ROM). The microprocessor 25 may take the form of a combination module which includes a random access memory (RAM) and a clock oscillator in addition to the conventional counters, registers, accumulators, flag flip flops, etc., such as a Motorola Microprocessor MC-6802. Alternatively, the microprocessor 25 may take the form of a microprocessor utilizing an external RAM and clock oscillator.

The microprocessor 25 controls the carburetor 12 and the malfunction lamp 23 by executing an operating program stored in a ROM section of a combination module 26. The combination module 26 also includes an input/output interface and a programmable timer. The combination module 26 may take the form of a Motorola MC-6846 combination module. Alternatively, the digital system may include separate input/output interface modules in addition to an external ROM and timer. The input conditions upon which open loop and closed loop of air/fuel ratio are based and the diagnostic interrogation signal from the diagnostic interrogation switch 24 are provided to the input/output interface of the combination circuit 26. The discrete inputs such as the output of a wide open throttle switch 30 and the diagnostic interrogation signal provided by the diagnostic interrogation switch 24 are coupled to discrete inputs of the input/output interface of the combination circuit 26. The analog signals including the air/fuel ratio signal from the sensor 20 and the engine coolant temperature signal TEMP are provided to a signal conditioner 32 whose outputs are coupled to an analog-to-digital converter-multiplexer 34. The particular analog condition sampled and converted is controlled by the microprocessor 25 in accord with the operating program via the address lines from the input/output interface of the combination circuit 26. Upon command, the addressed condition is converted to digital form and supplied to the input/output interface of the combination circuit 26 and then stored in ROM designated memory locations in the RAM.

The duty cycle modulated output for controlling the air/fuel solenoid in the carburetor 12 is provided by an output counter section of an input/output interface circuit 36. The output pulses to the carburetor 12 are provided via a conventional solenoid driver circuit 37. The output counter section receives a clock signal from a clock divider 38 and a 10 hz signal from the timer section of the combination circuit 26. In general, the output counter section of the circuit 36 may include a register into which a binary number representative of the desired pulse width is inserted. Thereafter at the frequency of the 10 hz signal from the timer section of the circuit 26, the number is gated into a down counter which is clocked by the output of the clock divider 38 with the output pulse of the output counter section having a duration equal to the time required for the down counter to be counted down to zero. In this respect, the output pulse may be provided by a flip flop set when the number in the register is gated into the down counter and reset by a carry out signal from the down counter when the number is counted to zero.

The circuit 36 also includes an input counter section which receives speed pulses from an engine speed transducer or the engine distributor that gate clock pulses to a counter to provide an indication of engine speed. An output discrete section of the circuit 36 energizes the malfunction lamp 23 to indicate the occurrence of a fault and, in response to a diagnostic interrogation signal, flashes the malfunction lamp 23 via a driver circuit 39, which may take the form of a Darlington transistor energized to ground the malfunction lamp 23, to indicate stored malfunctions. The output discrete section may include, for example, a flip flop which is set and reset in accord with the desired energization and deenergization periods of malfunction lamp 23.

While a single circuit 36 is illustrated as having an output counter section, input counter section and output discrete section, each of those sections may take the form of separate independent circuits.

The system further includes a nonvolatile memory 40 having memory locations into which data can be stored and from which data may be retrieved. In this embodiment, the nonvolatile memory 40 takes the form of a RAM having power continuously applied thereto directly from the vehicle battery and bypassing the engine ignition switch 22 so that the contents therein are retained in memory during the shutdown mode of the engine 10 when the ignition switch 22 is in its off position. Alternatively, the nonvolatile memory 40 may take the form of a memory having the capability of retaining its contents in memory without the application of power thereto.

The microprocessor 25, the combination module 26, the input/output interface circuit 36 and the nonvolatile memory 40 are interconnected by an address bus, a data bus and a control bus. The microprocessor 25 accesses the various circuits and memory locations in the ROM, the RAM and the nonvolatile memory 40 via the address bus. Information is transmitted between circuits via the data bus and the control bus includes lines such as read/write lines, reset lines, clock lines, etc.

As previously indicated, the microprocessor 25 reads data and controls the operation of the carburetor 12 and the malfunction lamp 23 by execution of its operating program as provided in the ROM section of the combination circuit 26. Under control of the program, various input signals are read and stored in ROM designated locations in the RAM section of the microprocessor 25 and the operations are performed for controlling the air and fuel mixture supplied by carburetor 12 and for performing the diagnostic and monitoring functions.

Figures 4, 5:
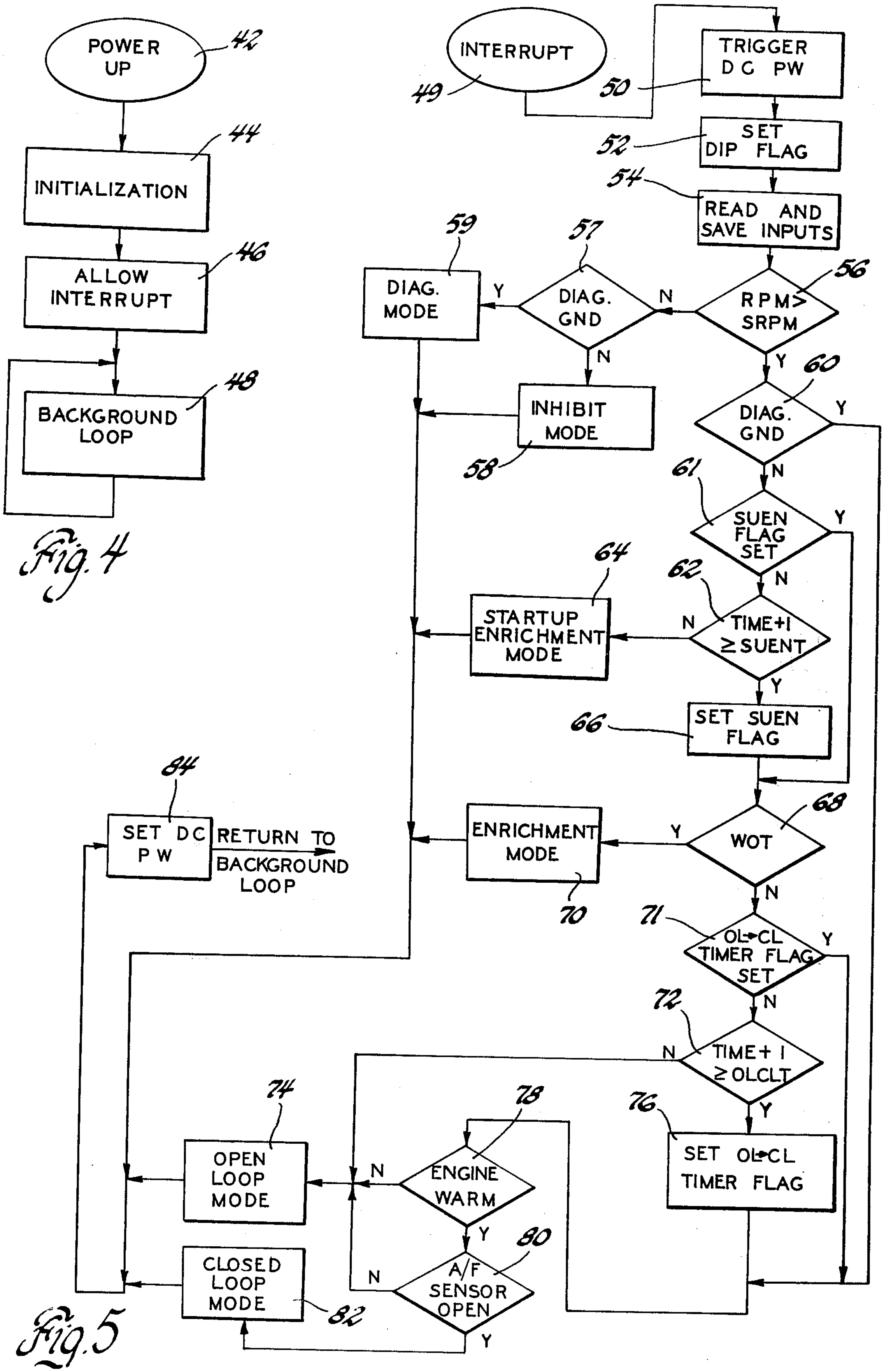

Referring to FIG. 4, when the ignition switch 22 is first operated to start the vehicle engine 10 and to apply power to the various circuits including the electronic control unit 18, the computer program is initiated at point 42 when power is first applied and proceeds to step 44. At this step, the computer provides for initialization of the system. For example, at this step, system initial values stored in the ROM are entered into ROM designated locations in the RAM in the microprocessor 25 and counters, flag flip flops and timers are initialized.

After the initialization step 44, the program proceeds to step 46 wherein the program allows interrupt routines to occur. After step 46, the program shifts to a background loop 48 which is continuously repeated. The background loop 48 may include control functions such as EGR control in addition to the diagnostic and warning routines of this invention.

While the system may employ numerous interrupts at various spaced intervals such as 12½ milliseconds and 25 milliseconds, it is assumed for purposes of illustrating the diagnostic and warning concept of this invention that a single 100 millisecond interrupt routine is provided that is repeated each 100 milliseconds.

During each 100 millisecond interrupt routine, the electronic control unit 18 determines the carburetor control pulse width in accord with the sensed engine operating conditions and issues a pulse to the carburetor solenoid driver 37. The 100 millisecond interrupt routine is initiated by the timer section of the combination circuit 26 which issues an interrupt signal at a 10 hz rate that interrupts the background loop routine 48. After each interrupt, the program enters the 100 millisecond interrupt routine at step 49 and proceeds to step 50 wherein the carburetor control pulse width in the register in the output counter section of the input/output circuit 36 is shifted to the output counter to initiate the generation of the carburetor control pulse as previously described. This pulse has a duration determined in accord with the engine operation to produce the desired duty cycle signal for adjusting the carburetor 12 so as to obtain the desired air/fuel ratio of the mixture supplied to the engine 10. Following the step 50, the program proceeds to step 52 wherein a display in progress (DIP) flag is set. As will be described, the DIP flag prevents the execution of the diagnostic and warning routine more than once during each 100 millisecond period beginning at each 100 millisecond interrupt. The program then proceeds to step 54 where the computer executes a read routine where predetermined parameters measured during the prior 100 millisecond interrupt routine, including the value of the $0_2$ sensor signal output, are saved by inserting them into ROM designated RAM locations. Thereafter, the discrete inputs, such as from the wide open throttle switch 30 and the diagnostic interrogation switch 24, are stored in ROM designated memory locations in the RAM, the engine speed determined via the input counter section of the input/output circuit 36 is stored at a ROM designated memory location in the RAM and the various inputs to the analog-to-digital converter including the engine temperature signal TEMP and the sensor 20 signal are one by one converted by the analog-to-digital converter multiplexer 34 into a binary number representative of the analog signal value and stored in respective ROM designated memory locations in the RAM.

Following step 54 the program proceeds to the step 56 where the engine speed RPM stored in the RAM at step 54 is read from the RAM and compared with a reference engine speed value SRPM that is less than the engine idle speed, but greater than the cranking speed during engine start. If the engine speed is not greater than the reference speed SRPM, indicating the engine has not started, the program proceeds to decision point 57 where the input from the diagnostic interrogation switch 24 is sampled. If a diagnostic interrogation signal (ground) is not present, the program proceeds to an inhibit mode of operation at step 58 where the carburetor control pulse width for controlling the carburetor 12 and which is stored at a RAM location designated by the ROM to store the carburetor control pulse width is set essentially to zero to thereby produce zero % duty cycle signal for setting the carburetor 12 to a rich setting to assist in vehicle engine starting. If the engine is not running and the diagnostic interrogation signal is present, the program proceeds from decision point 57 to step 59 where various system solenoids are energized and a predetermined carburetor control pulse width is set into the RAM location at which the carburetor control pulse width is stored. For example, at step 59 an air divert solenoid, torque converter clutch solenoid, EGR solenoid and a canister purge solenoid may be energized and a pulse width producing a 50% duty cycle may be stored in the RAM location at which the carburetor control pulse width is stored. In this manner a mechanic may check operation of the various solenoids by closing the diagnostic interrogation switch 24 with the engine 10 off.

If the engine speed is greater than the reference speed SRPM indicating the engine is running, the program proceeds from decision point 56 to a decision point 60 where the input from the diagnostic interrogation switch 24 is sampled. If a diagnostic interrogation signal (ground) is not present, the program proceeds to decision point 61 where a startup enrichment flag in the microprocessor 25 is sampled. If the flag is reset indicating that a startup enrichment period has not yet expired, the program proceeds to decision point 62 where a startup timer counter in the microprocessor 25 is incremented and then compared with a calibration startup enrichment time SUENT stored in the ROM section of the circuit 26. If the time is less than the calibration period, the program proceeds to step 64 wherein a startup enrichment mode routine is executed. During this startup enrichment mode, the carburetor control pulse width stored in the RAM location designated to store the carburetor control pulse width is set to a value for producing startup enrichment and may be obtained from a lookup table in the ROM as a function of temperature. If at step 62 it is determined that the startup time period has expired, the program proceeds to the step 66 where the startup enrichment flag in the microprocessor 25 is set so that during the next 100 millisecond interrupt period, the program proceeds directly from the decision point 61 to a decision point 68 to thereby bypass the startup enrichment mode 64.

From step 66 the program proceeds to decision point 68, where it is determined whether or not the engine is operating at wide open throttle thereby requiring power enrichment. This is accomplished by addressing and sampling the information stored in the ROM designated memory location in the RAM at which the condition of the wide open throttle switch 30 was stored at step 54. If the engine is at wide open throttle, the program cycle proceeds to step 70 at which an enrichment routine is executed wherein the width of the carburetor control pulse width resulting in the duty cycle required to control the carburetor 12 for power enrichment is determined and stored in the RAM memory location designated to store the carburetor control pulse width.

If the engine is not at wide open throttle, the program cycle proceeds from decision point 68 to decision point 71 where an open loop to closed loop timer flag in the microprocessor 25 is sampled. If the timer flag is in a reset condition, the program proceeds to a decision point 72 where the open loop to closed loop timer is incremented and compared with a calibration value OLCLT which is the time in terms of 100 millisecond periods after engine startup before closed loop mode may be enabled. If the time has expired, the program proceeds to step 74 where an open loop mode is executed. During this mode, an open loop pulse width is determined in accord with input parameters such as engine temperature read and stored in the RAM at program step 54. The determined open loop pulse width is stored in the RAM location assigned to store the carburetor control pulse width.

If at decision point 72 it is determined that the open loop to closed loop time has expired, the program proceeds to step 76 where the open loop to closed loop timer flag is set. Thereafter during the next 100 millisecond interrupt routine, the program proceeds from the decision point 71 directly to the decision point 78. From the step 76, the program proceeds to the decision point 78 where the engine temperature stored in the RAM at step 54 is compared with a predetermined open loop to closed loop calibration value stored in the ROM. If the engine temperature is below this value, the program computer proceeds to the step 74 and executes the open loop routine previously described. If the engine temperature is greater than the calibration value, the program proceeds to the decision point 80 where it is determined if air/fuel ratio sensor 20 is operational. In this respect, the system determines operational status of the sensor 20 by the value of its temperature or impedance. If the air/fuel ratio 20 is determined to be inoperative (high impedance or cold temperature) the program proceeds to the step 74 where the open loop routine previously described is executed. However, if at decision point 80 the air/fuel sensor 20 is determined to be operational, all the conditions exist for closed loop operation and the program proceeds to the step 82 where the closed loop routine is executed to determine the carburetor control signal pulse width in accord with the sensed air/fuel ratio. The determined closed loop pulse width is stored in the RAM location assigned to store the carburetor control pulse width.

From each of the program steps 58, 59, 64, 70, 74 and 82, the program cycle proceeds to step 84 at which the carburetor control pulse width determined in the respective one of the operating modes is read from the RAM and entered in the form of a binary number into the register in the output counter section of the input/output circuit 36. This value is thereafter inserted into the down counter at step 50 during the next 100 millisecond interrupt period to initiate a pulse output to the air/fuel solenoid having the desired width. The carburetor control pulse is issued to energize the air/fuel ratio control solenoid in the carburetor 12 each 100 millisecond interrupt period so that the pulse width issued at a 10 hz frequency defines the variable duty cycle control signal for adjusting the carburetor 12.

When the vehicle engine is started and the diagnostic interrogation signal is generated by closure of the switch 24 so as to monitor and check system operation and to command a readout of the malfunctions stored in the nonvolatile memory 40, it is desirable to place the system in closed loop mode operation as soon as possible after engine start and thereby avoid excessive time periods before system operation in closed loop may be checked. This is accomplished by the program bypassing the imposed time requirements before the system may operate in closed loop. These imposed time requirements are the startup enrichment time SUENT and the open loop to closed loop time OLCLT. This is accomplished at decision point 60 when it is detected that the diagnostic interrogation ground signal is present after which the program cycle directly proceeds from decision point 60 to decision point 78. In this manner, when the engine is started and the diagnostic lead is grounded, closed loop mode of operation is initiated when the engine temperature has reached the engine warm criteria at decision point 78 and the air/fuel ratio sensor is determined to be operational at the decision point 80.

Figure 6:
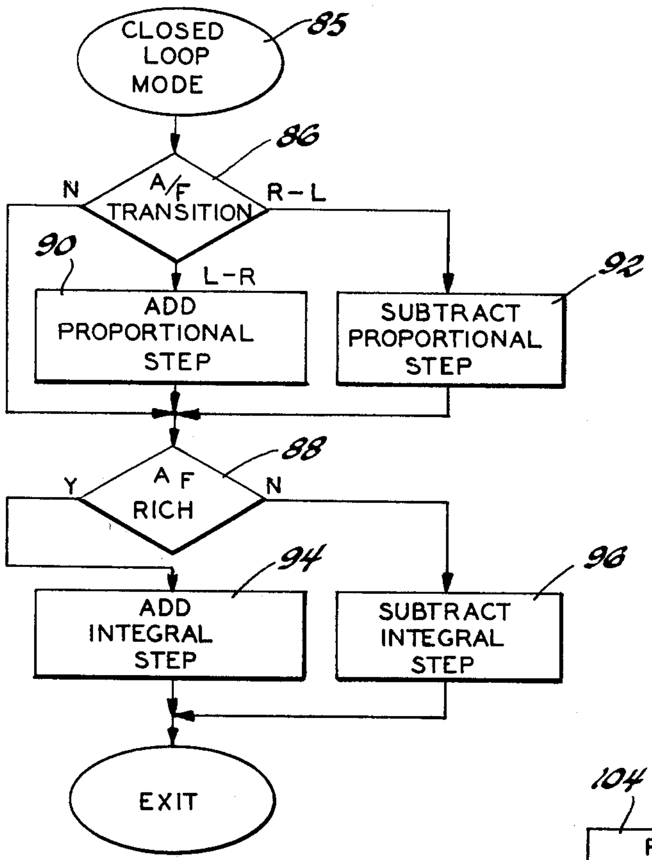

Referring to FIG. 6, there is illustrated the closed loop mode routine of step 82 of FIG. 5. The program enters the closed loop mode at step 85 and proceeds to a decision point 86 where the present rich or lean state of the air/fuel ratio relative to stoichiometric ratio (the sense of deviation of the value of the signal provided by the sensor 20 relative to a stoichiometric reference level) is compared with the rich or lean state of the air/fuel ratio during the prior 100 millisecond interrupt period (the sense of deviation of the value of the saved sensor signal at step 54 relative to the stoichiometric reference level) to determine if there has been a transition in the air/fuel ratio relative to the stoichiometric ratio. If a transition has not occurred, only an integral term adjustment is provided to the stored carburetor control pulse width and the program cycle proceeds to a decision point 88. If a lean-to-rich transition is detected, the program proceeds to a step 90 wherein a predetermined proportional term value stored in the ROM is added to the carburetor control pulse width value stored in the RAM to effect a proportional step increase in the duty cycle of the carburetor control signal. If a rich-to-lean transition is detected, the program proceeds to a step 92 wherein a predetermined proportional term value stored in the ROM is subtracted from the carburetor control pulse width stored in the RAM to effect a proportional step decrease in the calculated duty cycle of the carburetor control signal.

From either of the steps 90 and 92, the program cycle proceeds to the decision point 88 where the rich or lean state of the air/fuel ratio determined by the value of the signal provided by the sensor 20 relative to the stoichiometric ratio is sensed. If the air/fuel ratio is rich relative to the stoichiometric ratio, the program cycle proceeds to a step 94 where a predetermined integral step is added to the carburetor control pulse width value stored in the RAM. If the air/fuel ratio is lean relative to the stoichiometric value, a predetermined integral step is subtracted at step 96 from the carburetor control pulse width stored in the RAM. From the steps 94 or 96, the program exits the closed loop mode routine at step 97 and proceeds to the step 84 previously described. During continued closed loop operation of the electronic control unit 18, the carburetor control duty cycle varies in direction tending to restore the stoichiometric air/fuel ratio.

Figure 7:
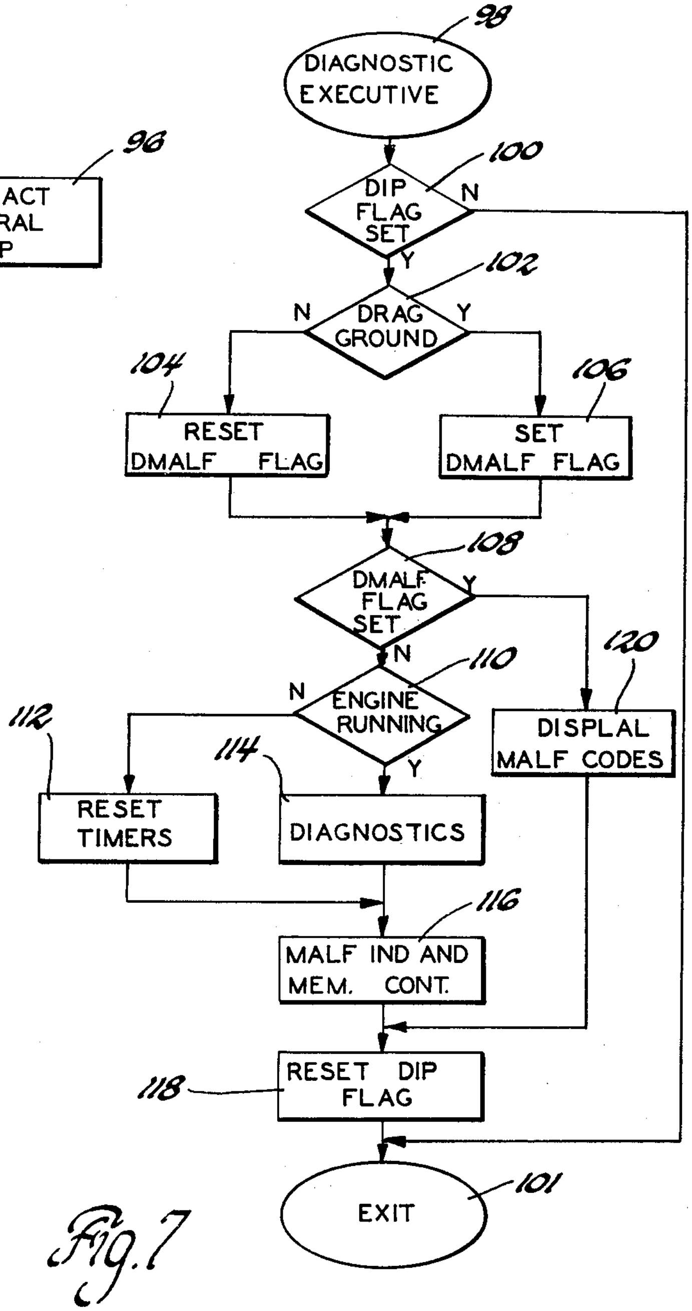

Referring to FIG. 7, the diagnostic executive routine performed in the background loop 48 of FIG. 4 is illustrated. The diagnostic executive routine is entered at step 98 and proceeds to decision point 100 where the state of the DIP flag in the microprocessor 25 is sampled. This flag was set at step 52 in the 100 millisecond interrupt routine of FIG. 5 and is in a set condition if the diagnostic executive routine has not been executed since the last 100 millisecond interrupt. If the DIP flag is reset indicating that the diagnostic executive routine has been executed in the 100 millisecond period since the last 100 millisecond interrupt, the program bypasses the diagnostic executive routine and exits at point 102 and continues the background loop 48. However, if the DIP flag is set, the program proceeds to decision point 102 where it is determined whether or not the diagnostic interrogation switch 24 is closed thereby commanding a readout of the fault conditions stored in the nonvolatile memory 40.

If the diagnostic interrogation switch 24 is open, the program proceeds to step 104 where a display malfunction flag is reset. If, however, the diagnostic interrogation switch 24 is closed thereby generating a diagnostic interrogation signal, the program proceeds from the decision point 102 to step 106 where the display malfunction flag is set.

From the steps 104 and 106, the program proceeds to decision point 108 where the state of the display malfunction flag is sampled. If the display malfunction flag is reset indicating that the diagnostic interrogation switch 24 is open, the program proceeds to a decision point 110 where it is determined whether the engine is running in a manner similar to the step 56 of FIG. 5. If the engine is not running, the program proceeds to step 112 where the various diagnostic counters timing durations of certain events are all reset. If, however, the engine is running, the program proceeds from decision point 110 to point 114 where a diagnostics routine is executed. This routine will be described with reference to FIG. 8.

From the diagnostics routine 114, the program proceeds to step 116 where a malfunction indication and memory control routine is executed. During this routine, the malfunction lamp 23 is energized during the period of a detected fault condition and the detected fault conditions are stored in the nonvolatile memory 40. Following step 116, the program proceeds to the step 118 where the DIP flag is reset indicating that the diagnostic executive routine has been executed during the 100 millisecond period since the last 100 millisecond interrupt. Thereafter, at step 100, the program bypasses the diagnostic executive routine until the next 100 millisecond interrupt after which the DIP flag is set at step 52 of FIG. 5.

If at decision point 108 it is determined that the display malfunction flag was set at step 106 indicating that the diagnostic interrogation switch 24 is closed to supply a diagnostic interrogation signal to the electronic control unit 18, the program proceeds to the step 120 where a display malfunction code routine is executed wherein the malfunction lamp 23 is flashed in accord with predetermined codes to provide an indication of each of the detected fault conditions stored in the nonvolatile memory 40. In this respect, the memory locations in the nonvolatile memory 40 at which the fault conditions are stored are sequentially sampled and when a stored fault condition is detected, the malfunction lamp 23 is flashed with a code representative of that fault condition. For example, a particular fault condition stored in the nonvolatile memory may be assigned the code 14 so that the malfunction lamp 23 is first flashed once followed by a pause after which the malfunction lamp 23 is flashed four times thereby representing the code 14 so that the vehicle operator or mechanic is informed of the fault that has occurred. In this manner, the program sequentially flashes the codes of all of the malfunctions or fault conditions stored in the nonvolatile memory 40.

Figure 10:
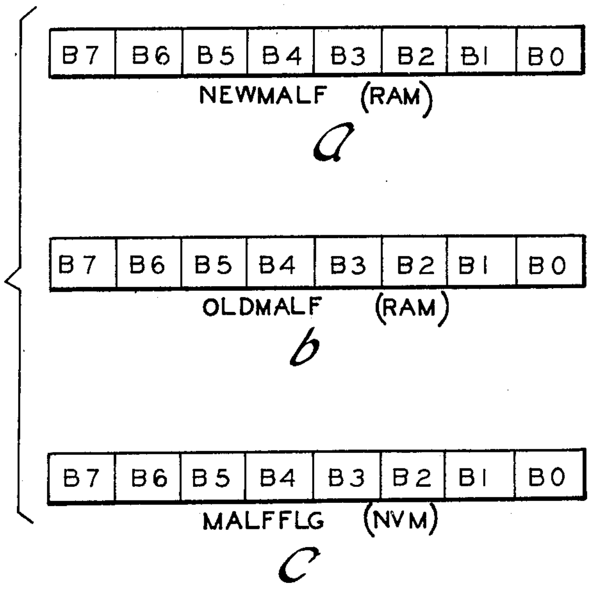

Referring to FIG. 10, there is illustrated the memory locations in the RAM section of the microprocessor 25 and the nonvolatile memory 40 for storing information relative to faults that occur. Each memory location is comprised of eight bits with the corresponding bit in each memory location representing a particular condition being monitored relative to the sensing of fault conditions. For example, FIG. **10*a* is representative of a memory location NEWMALF in the RAM having eight bit malfunctions detected during the present 100 millisecond period are stored. FIG. 10*b* is representative of a memory location OLDMALF in the RAM having eight bits where malfunctions that occurred during the prior 100 millisecond period are stored. FIG. 10*c* is illustrative of a memory location MALFFLG is the nonvolatile memory 40 having eight bits where the malfunctions detected for two consecutive 100 millisecond periods are stored and retained in memory during shutdown periods of the vehicle engine. In each of the memory locations NEWMALF, OLDMALF and MALFFLG, each corresponding bit corresponds to a particular condition or parameter being monitored. For example, in the present embodiment the least significant bit $B_0$ in each of the memories is associated with a shorted coolant temperature sensor circuit, the bit $B_1$ is associated with an opened circuited coolant temperature sensor circuit, the bit $B_2$ is associated with a shorted oxygen sensor circuit and bit $B_3$ is associated with an open circuited oxygen sensor circuit. Each of the remaining bits $B_4$ thru $B_7$ may be associated with other desired engine conditions being monitored and whose fault condition is to be stored. If more than eight parameters are being monitored, additional memory locations may be used. Each bit in the memory locations NEWMALF, OLDMALF in the RAM and in the memory location MALFFLG in the nonvolatile memory 40** is initially reset to logic 0 when no malfunctions or fault conditions are detected and are set to a logic 1 when the parameter corresponding thereto is representative of a fault condition.

Figure 8:
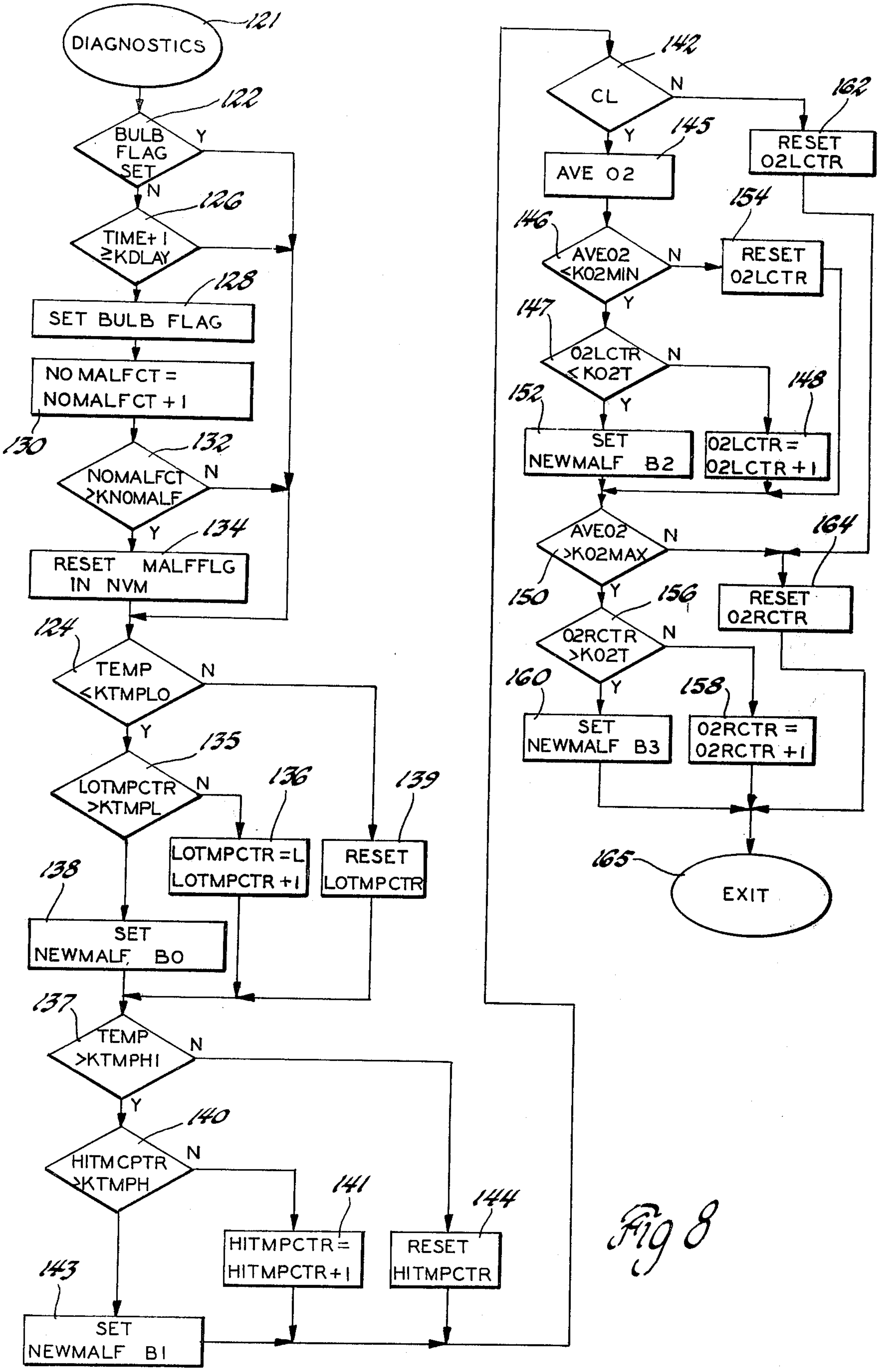

Referring to FIG. 8, the diagnostics routine 114 is illustrated wherein the operating conditions of predetermined parameters of the system of FIG. 1 are sampled and compared with limits representative of fault conditions. For purposes of illustrating the invention, it is assumed that the diagnostics routine is effective to monitor the continuity of the temperature sensing circuit and the continuity of the oxygen sensor circuit associated with the sensor 20. It is understood that numerous other circuits or parameters may be checked for faulted conditions including pressure sensor circuits, the speed sensor circuit and the carburetor A/F ratio control solenoid.

In addition to detecting the occurrence of a parameter being outside predetermined limits, the diagnostics routine illustrated in FIG. 8 functions to enable the energizing of the malfunction lamp 23 for test purposes for a predetermined time period after the engine is first started and, in accord with this invention, to erase the faults detected and stored in the nonvolatile memory 40 after a predetermined time period has lapsed since the last detected fault condition.

The program enters the diagnostics routine 114 at step 121 and proceeds to a decision point 122 where the state of a bulb flag in the microprocessor 25 is sampled. If the bulb flag is set, it represents that the malfunction lamp 23 has been energized for the predetermined test period after the engine has been started. If the flag is set, the program proceeds to a decision point 124. However, if the bulb flag is reset indicating that the time period has not lapsed since the engine has started, the program cycle proceeds to a decision point 126 where a bulb flag time counter is incremented and compared with a calibration value KDLAY in the ROM representing the time duration that the malfunction lamp 24 is to be energized after engine start. If the time has not expired, the program cycle proceeds to the decision point 124. However, if at decision point 126 it is determined that the time period has expired, the program proceeds to step 128 where the bulb flag is set so that at step 122 during the next execution of the diagnostics routine, the program proceeds directly to the decision point 124.

After step 128 the program cycle proceeds to a step 130 where a no-malfunction count NOMALFCT stored in a memory location in the nonvolatile RAM 40 is incremented. This count represents the time since the last detected fault condition. While in another embodiment a real time counter may be employed, in this embodiment, time is represented by the number of times that the vehicle engine is started. Since the program proceeds from the decision point 126 to the step 130 only once after each engine start, the no-malfunction count NOMALFCT is incremented only once for each engine start. After the step 130, the value of the no-malfunction count is compared with a calibration constant KNOMALF in the ROM section of the combination circuit 26. If the number of engine starts represented by the no-malfunction count is less than the calibration value, the program cycle proceeds to the decision point 124. However, if the no-malfunction count is greater than the calibration value KNOMALF, the program proceeds to the step 134 where all of the bits in the memory location MALFFLG in the nonvolatile memory 40 that are at a logic 1 level representing detected fault conditions are reset to logic 0 to thereby erase from memory all stored fault conditions. As will be described, the no-malfunction count NOMALFCT is reset to zero each time a new malfunction is detected. Therefore, the fault conditions stored in the nonvolatile memory location MALFFLG are erased after a period represented by a predetermined number of vehicle starts since the last detected fault condition. In this manner, old nonrecurring self-correcting faults are removed from memory and accordingly not indicated at step 120 of FIG. 7 in response to a diagnostic interrogation signal. Following the step 134, the program proceeds to the decision point 124.

Beginning at decision point 124, the program initiates a routine to determine whether a shorted coolant temperature sensor circuit exists. At decision point 124, the value of the coolant temperature read at step 54 is compared with a calibration value KTMPLO representing a low value of coolant temperature. Alternatively, a filtered value of coolant temperature may be used. If the temperature is less than the calibration value KTMPLO, the program proceeds to step 135 where the time that the temperature is below the calibration parameter is compared with a calibration time KTMPL. If the temperature is below the calibration temperature for a time less than the calibration time, the program proceeds to step 136 where a low temperature counter in the microprocessor 25 representing the time that the temperature is below the calibration temperature is incremented. From step 136, the program proceeds to a decision point 137. However, if the temperature is below the calibration temperature KTMPLO for a duration greater than the calibration time period KTMPL determined at decision point 135, the program proceeds to the step 138 where the bit $B_0$ at the memory location NEWMALF in the RAM is set to a logic 1 to indicate that a short circuited coolant temperature sensor circuit is detected. From step 138, the program proceeds to the decision point 137. If at decision point 124 the temperature is determined to be greater than the calibration temperature KTMPLO, the program proceeds to the step 139 where the low temperature time counter is reset. From step 139, the program proceeds to the decision point 137.

Beginning at decision point 137, the program initiates a routine for determining whether an open temperature sensing circuit exists. At the decision point 137, the engine coolant temperature read at step 54 or, alternatively, a filtered coolant temperature, is compared with a calibration value KTMPHI representing a high value of coolant temperature which is greater than the normal operating coolant temperature. If the coolant temperature exceeds the calibration parameter, the program proceeds to decision point 140 where a high temperature counter in the microprocessor 25 representing the time duration that the temperature exceeds the calibration parameter KTMPHI is compared with a calibration time KTMPH. If the temperature has not exceeded the calibration valued for a time greater than the time KTMPH, the program proceeds to the step 141 where the high temperature counter is incremented. Thereafter, the program proceeds to a decision point 142. If at decision point 140 it is determined that the temperature has exceeded the calibration temperature KTMPHI for a duration greater than the calibration time period KTMPH, the program proceeds to the step 143 where the bit $B_1$ in the RAM memory location NEWMALF is set to a logic 1 to indicate a detected open coolant temperature sensor circuit. Thereafter, the program proceeds to the decision point 142. At decision point 137, if the coolant temperature is determined to be less than the calibration value KTMPHI, the program proceeds to the step 144 where the high temperature counter is reset to 0. Following step 144, the program cycle proceeds to the decision point 142 where the routine for determining whether a shorted oxygen sensor circuit is initiated.

At step 142, the computer determines whether or not the electronic control unit 18 is operating in a closed loop mode determined by operation of the routine at step 82. If the system is operating in the closed loop mode, the program proceeds to step 145 where a running average of the value of the output of the oxygen sensor 20 is updated in accord with the value sensed at step 54 of FIG. 5. From step 145 the program proceeds to decision point 146 where the average $0_2$ sensor value is compared with a calibration value K02MIN which is less than the normal average value of the oxygen sensor signal. If the average oxygen sensor signal value is less than the calibration value K02MIN, the program proceeds to the decision point 147 where a lean counter 02LCTR in the microprocessor 25 representing the time that the average oxygen sensor signal is less than the calibration value K02MIN is compared with a reference value K02T. If the time represented by the count in the counter is less than the calibration value K02T, the program proceeds to the step 148 where the counter is incremented. Thereafter, the program proceeds to the decision point 150. If, however, at decision point 147 it is determined that the oxygen sensor average value is less than the calibration value K02MIN for a period greater than calibration value K02T, the program proceeds to the step 152 where the bit $B_2$ in the memory location NEWMALF in the RAM is set to a logic 1 to provide an indication of a detected short circuit oxygen sensor circuit. If at step 146 the average oxygen sensor signal is greater than the calibration value K02MIN, the program proceeds to the step 154 where the counter 02LCTR is reset. Thereafter, the program proceeds to the decision point 150.

Beginning at step 150, the program determines whether a Failed Rich condition exists in the oxygen sensor circuit. At the decision point 150, the average oxygen sensor signal value is compared with a calibration constant K02MAX which is greater than the normal average value of the oxygen sensor signal. If the average oxygen sensor signal is greater than the calibration value K02MAX, the program proceeds to the decision point 156 where a counter 02RCTR in the microprocessor 25 timing the duration that the average oxygen sensor signal is greater than the calibration value K02MAX is compared with the calibration value K02T. If the counter value is less than the calibration time K02T, the program proceeds to point 158 where the counter 02RCTR is incremented. However, if at step 156 it is determined that the average oxygen sensor signal is greater than the calibration value K02MAX for a time greater than the calibration time K02T, the program proceeds to the step 160 where the bit $B_3$ in the memory location NEWMALF in the RAM is set to indicate a detected Failed Lean Condition in the oxygen sensor circuit.

If at step 142, it is determined that the system is not operating in closed loop so that the oxygen sensor average value relative to the calibration values is not representative of fault conditions, the program proceeds to a step 162 where the $O_2$ lean counter 02LCTR is reset. Thereafter, the program proceeds to step 164 where the $O_2$ rich counter 02RCTR is reset. Similarly, if at step 150 it is determined that the average $O_2$ sensor signal value is less than the calibration value K02MAX, the program proceeds to the step 164 to reset the $O_2$ rich counter 02RCTR. After the steps 158, 160 and 164, the program exits the diagnostics routine at point 165 and proceeds to the malfunction indicator and memory control routine 116 illustrated in FIG. 9.

Figure 9:
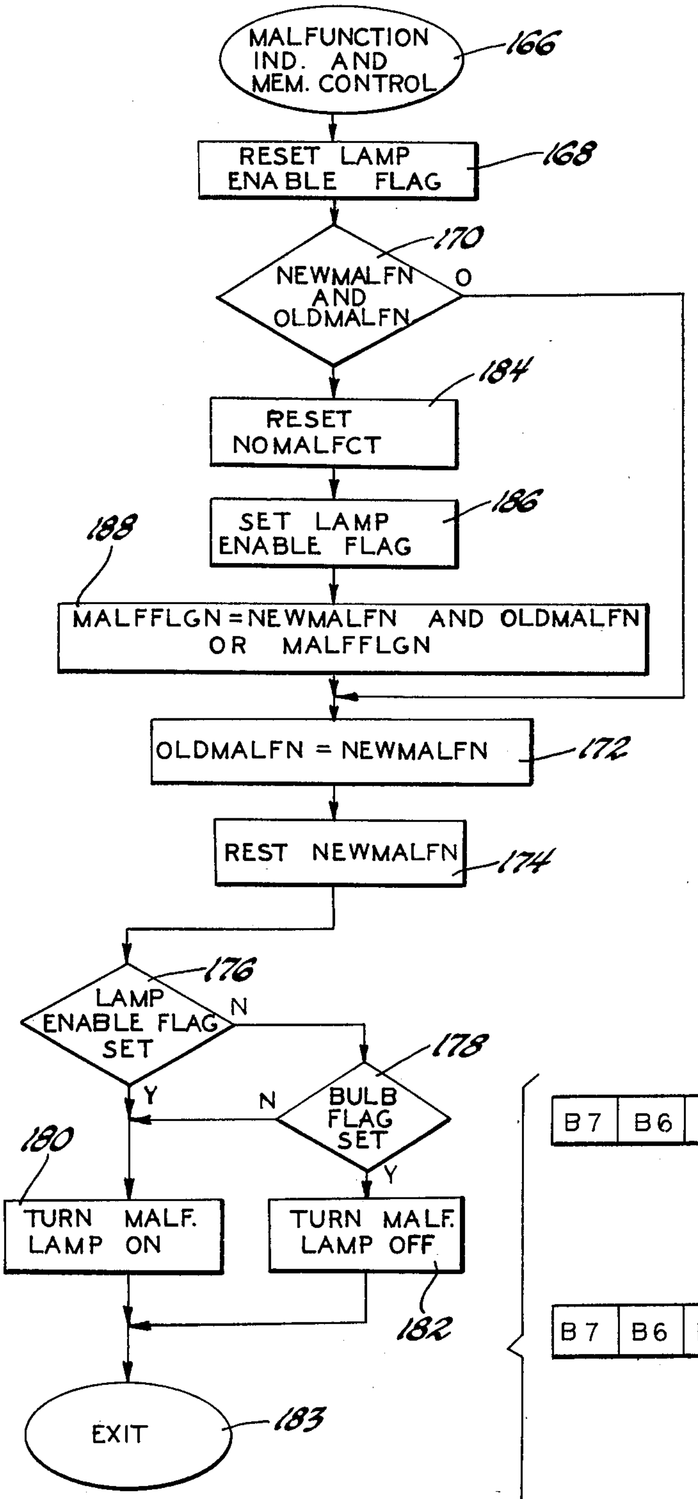

Referring to FIG. 9, the malfunction indicator and memory control routine is entered at point 166 and proceeds to a step 168 where a lamp enable flag in the microprocessor 25 is reset. When set, this flag is representative of a condition for energizing the malfunction lamp 23 to provide an indication of the existence of a fault condition.

From step 168 the program proceeds to decision point 170 where each bit in the RAM location NEWMALF is logically ANDED with the corresponding bit in the RAM location OLDMALF. If none of the corresponding pairs of bits are both at logic 1 levels so that only in the RAM memory location OLDMALF is in a reset condition so logic 0's result from the AND comparison, the program proceeds from the decision point 170 to a step 172 where each corresponding bit in the memory location OLDMALF in the RAM is set to the same logic level as the corresponding bit in the memory location NEWMALF. From step 172, the program proceeds to step 174 where each bit in the memory location NEWMALF in the RAM is reset to logic 0. From step 174 the program proceeds to a decision point 176 where the lamp enable flag in the microprocessor 25 is sampled. If this flag is reset, the program proceeds to decision point 178 where the bulb flag in the microprocessor 25 is sampled. As previously indicated with respect to FIG. 8 and particularly steps 122, 126 and 128, the bulb flag is reset for a predetermined calibration time period KDLAY after the engine 10 is started. During this time period the program proceeds from the step 178 to the step 180 where the malfunction lamp is energized via the output discrete section of the circuit 36. However, after the expiration of the predetermined time period KDLAY, the bulb flag is set at step 128 so that at step 178 the program proceeds to the step 182 where the malfunction lamp is deenergized. From steps 180 and 182, the program exits the malfunction lamp control routine at point 183.

During the 100 millisecond period after the next 100 millisecond interrupt, the aforementioned routines including the diagnostics routine of FIG. 8 are repeated with the bits in the RAM memory location NEWMALF being set in accord with sensed open or short circuit conditions. In this embodiment, a fault condition is determined to exist if open or short circuit condition or other out of tolerance parameter being monitored exists for two consecutive 100 millisecond periods. Assuming a short or open circuit condition is detected for two 100 millisecond periods, a logic 1 results when the corresponding bit in the RAM location NEWMALF is ANDED with the corresponding bit in the RAM location OLDMALF. When this condition exists, the program cycle proceeds from decision point 170 to step 184 where the no-malfunction counter previously described and whose count represents the time in terms of engine starts since the last detected fault condition is reset. The no-malfunction counter is thereafter incremented once for each engine start at step 132 as previously described with reference to FIG. 8 to time the duration since the last detected fault condition.

Following step 184, the program proceeds to step 186 where the lamp enable flag in the microprocessor 25 is set to indicate the existence of a fault condition represented by the occurrence of a detected open or short circuit condition for a period of two 100 millisecond periods. From step 186 the program proceeds to the step 188 where the newly detected fault condition is stored in the nonvolatile memory at the bit in the address location MALFFLG corresponding to the newly detected fault condition. This is accomplished by setting each bit N in the memory location MALFFLG in accord with the logic combination NEWMALFN AND OLDMALFN OR MALFFLGN where N is the bit number in the respective memory locations.

Following the step 188, the program proceeds to step 172 and continues as previously described. At decision point 176, since the lamp enable flag was set at step 186, the program proceeds from step 176 to the step 180 to energize the malfunction lamp to represent existence of a fault condition.

To illustrate the operation of the diagnostic system described, it will be assumed that a shorted oxygen sensor circuit has just occurred. This condition is detected at steps 146 and 147. At step 152 the bit $B_2$ at the memory location NEWMALF in the RAM is set to a logic 1 to indicate the detected short circuit condition in the oxygen sensor circuit. Assuming this condition did not exist in the prior 100 millisecond period, the corresponding bit $B_2$ in the memory location OLDMALF in the RAM is a logic zero so that the logic AND combination of bit $B_2$ in the memory locations NEWMALF and OLDMALF is a logic zero. Consequently, from decision point 170, the program proceeds to step 172 where bit $B_2$ in the memory location OLDMALF is set to a logic 1. At step 174, bit $B_2$ in the memory location NEWMALF is reset to logic 0. Since the lamp enable flag was reset at step 168, the program then proceeds to step 182 where the malfunction lamp 23 is deenergized. During the next 100 millisecond period and assuming the short circuit condition continues, the short circuit condition is again detected at steps 144 and 146 so that the bit $B_2$ in the memory location NEWMALF is again set at step 152 to a logic 1. Thereafter, at step 170, the logic AND combination of bit $B_2$ in the memory locations NEWMALF and OLDMALF results in a logic 1 so that the program proceeds to the step 184 to reset the no-malfunction counter and then to step 186 to set the lamp enable flag. At step 188, bit $B_2$ in the memory location MALFFLG in the nonvolatile memory 40 is set to a logic 1 in accord with the logic AND combination of bit $B_2$ in the memory locations NEWMALF and OLDMALF. Since the lamp enable flag was set at step 186, the program proceeds from step 176 to step 180 where the malfunction lamp 180 is energized to indicate the fault condition.

Even though the short circuit condition in the oxygen sensor circuit self-corrects so that bit $B_2$ in the memory location NEWMALF remains a logic 0 and bit $B_2$ in the memory location OLDMALF is thereafter set to logic 0, the bit $B_2$ in the memory location MALFFLG in the nonvolatile memory is maintained at a logic 1 in accord with the logic OR combination in step 188 when step 188 is executed in response to another detected fault condition.

If the short $O_2$ circuit condition self corrects, the program proceeds from step 170 to steps 172 and 174 and thereafter to step 176 which determines that the lamp enable flag is reset so that the malfunction lamp is deenergized at step 182 to indicate that a fault condition no longer exists. Additionally, when no fault conditions exist, step 184 is bypassed and with each vehicle engine start, the no-malfunction counter is incremented at step 130 as described. If no new malfunctions are detected in the diagnostics routine of FIG. 8, bit $B_2$ in the memory location MALFFLG in the nonvolatile memory and any other bits set to a logic 1 in response to detected fault conditions are reset at step 134 when the number of times that the engine 10 is started exceeds the calibration value KNOMALF. In this manner, old nonrecurring self-correcting fault conditions are erased from the nonvolatile memory so that upon the closure of the diagnostics interrogation switch 24, those malfunctions will no longer be indicated by the coded flashing of the malfunction lamp 23.

While the foregoing example has assumed a single fault condition occurring at one time, it can be seen that the malfunction lamp will be energized whenevery any fault conditions are detected either singularly or simultaneously and that the detected fault conditions are stored in the nonvolatile memory at locations representative of the detected fault condition when they exist for a period of two 100 millisecond periods. Thereafter, if the fault conditions self correct, the malfunction lamp will be extinguished. However, the detected fault conditions may be determined by the closure of the diagnostic interrogation switch 24 to cause the particular malfunctions to be read from the nonvolatile memory 40 and flashed in coded form at step 120 of FIG. 7. After a time period determined by the number of engine starts, the detected malfunctions are erased from the nonvolatile memory so that there is no indication of those fault conditions in response to a diagnostic interrogation signal upon closure of the diagnostic interrogation switch 24.

The foregoing description of a preferred embodiment for the purposes of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. A diagnostic monitoring system for monitoring the conditions of predetermined parameters in a motor vehicle having a driving compartment comprising, in combination:

a memory nonvolatile as to engine operation having locations for storing detected fault conditions;

fault indicating means in the vehicle driving compartment effective to signal the occurrence of a fault condition;

means effective to (a) detect fault conditions in the predetermined parameters, (b) energize the fault indicating means during detected fault conditions, and (c) store the fault conditions detected in respective locations in the nonvolatile memory;

means effective to respond to a diagnostic interrogation signal for identifying the specific faulted conditions stored in the nonvolatile memory; and timer means effective to clear from the nonvolatile memory locations at least the stored detected fault conditions for which the timed period since the last detected fault condition exceeds a time that spans a substantial number of engine operating events since detection of a fault condition, whereby old nonrecurring self-correcting faults are cleared from memory and accordingly are not indicated in response to a diagnostic interrogation signal.

2. A diagnostic monitoring system for monitoring the conditions of predetermined parameters in an engine driven vehicle having a battery, a switch selectively operable to start and stop the engine and energize vehicle and engine electrical loads, and a driving compartment comprising, in combination:

a nonvolatile memory having locations for storing detected fault conditions;

fault indicating means in the driving compartment effective to signal the occurrence of a fault condition;

fault detection means effective to (a) compare the condition of each of the predetermined parameters with respective predetermined limits, (b) energize the fault indicating means during the period when the condition of a parameter is representative of a fault condition and (c) store a detected fault condition in a respective location in the nonvolatile memory;

means effective to provide a diagnostic interrogation signal for causing an indication of the faulted conditions stored in the nonvolatile memory;

a nonvolatile engine start counter;

means effective to increment the engine start counter each time the engine is started in response to operation of the switch;

means effective to reset the engine start counter each time a fault condition is detected by the fault detection means; and means effective to clear from the nonvolatile memory locations the stored detected fault conditions when the count in the engine start counter exceeds a predetermined number, whereby old nonrecurring self-correcting faults are cleared from memory and accordingly not indicated in response to a diagnostic interrogation signal.

3. A diagnostic monitoring system for monitoring the operating conditions of predetermined parameters in a vehicle engine control system comprising, in combination:

a battery;

a switch coupled to the battery selectively operable to start the engine and energize the control system and stop the engine and deenergize the control system;

a memory having locations for storing detected fault conditions and for storing an engine start count;

means effective to couple the battery directly to the memory so that the stored fault conditions and engine start count are retained in memory independent of the operation of the switch;

fault indicating means in the vehicle driving compartment effective to signal the occurrence of a fault condition;

fault detection means effective to (a) compare the condition of each of the predetermined parameters with respective predetermined limits, (b) energize the fault indicating means during the period when the condition of a parameter is representative of a fault condition and (c) store a detected fault condition in a respective location in the memory;

means effective to provide a diagnostic interrogation signal for causing an indication of the faulted conditions stored in the memory;

means effective to increment the engine start count stored in the memory each time the engine is started in response to operation of the switch;

means effective to clear the engine start count in the memory each time a fault condition is detected by the fault detection means; and means effective to clear from the memory locations the stored detected fault conditions when the engine start count exceeds a predetermined value, whereby old nonrecurring self-correcting faults are erased from memory and accordingly not indicated in response to a diagnostic interrogation signal.

* * * * *